US012803222B2

(12) United States Patent
Parys

(10) Patent No.: US 12,803,222 B2
(45) Date of Patent: Nov. 17, 2026

(54) APPARATUS FOR LATCHING AND UNLATCHING AN ELECTRICAL FUNCTION-RELATED MODULE AND METHOD FOR UNLATCHING AN ELECTRICAL FUNCTION-RELATED MODULE

(71) Applicant: Wöhner Besitz GmbH, Rödental (DE)

(72) Inventor: Fabian Parys, Coburg (DE)

(73) Assignee: WÖHNER BESITZ GMBH, Rödental (DE)

(*) Notice: Subject to any disclaimer, the term of this patent is extended or adjusted under 35 U.S.C. 154(b) by 333 days.

(21) Appl. No.: 18/634,464

(22) Filed: Apr. 12, 2024

(65) Prior Publication Data

US 2024/0347971 A1 Oct. 17, 2024

(30) Foreign Application Priority Data

Apr. 14, 2023 (EP) .................................... 23168091

(51) Int. Cl.
*H01R 13/633* (2006.01)
*H01R 13/627* (2006.01)
(Continued)

(52) U.S. Cl.
CPC ....... *H01R 13/633* (2013.01); *H01R 13/6275* (2013.01); *H01R 13/66* (2013.01); *H01R 25/162* (2013.01)

(58) Field of Classification Search
CPC .. H01R 16/633; H01R 13/6275; H01R 13/66; H01R 25/162
(Continued)

(56) References Cited

U.S. PATENT DOCUMENTS 7,131,854 B1 * 11/2006 Pavlovic .............. H01R 13/633 439/352
7,192,296 B1 * 3/2007 Little ................. H01R 13/6275 439/358
(Continued)

FOREIGN PATENT DOCUMENTS

| | | |
|---|---|---|
| EP | 2086065 A1 | 8/2009 |
| EP | 3766146 A1 | 1/2021 |
| EP | 3876358 A1 | 9/2021 |

OTHER PUBLICATIONS

European Search Report of corresponding EP Application No. 23168091.9, mailed Nov. 16, 2023. (9 pages).

*Primary Examiner* — Tulsidas C Patel
(74) *Attorney, Agent, or Firm* — Maginot, Moore & Beck LLP

(57) ABSTRACT

A device for latching and unlatching an electrical module includes first and second latching devices, each latching device having a latching tooth insertable into a retaining opening for latching the module. The latching tooth of the first and the second latching devices face away from each other and can be moved away from each other for latching the module and towards each other for unlatching the module. The device further includes a first carriage element, linearly movable along a first axis, a second carriage element, linearly movable along a second axis, a first converting device which converts a linear movement of the first carriage element into linear movement of the second carriage element perpendicular to the first axis, and a second converting device, which converts the linear movement of the second carriage element into movement of the latching teeth of different latching devices towards or away from each other.

16 Claims, 16 Drawing Sheets

(51) Int. Cl.
*H01R 13/66* (2006.01)
*H01R 25/16* (2006.01)

(58) Field of Classification Search
USPC ................................ 439/152, 949, 121, 532
See application file for complete search history.

(56) References Cited

U.S. PATENT DOCUMENTS

| | | | | |
|---|---|---|---|---|
| 12,047,126 | B1 * | 7/2024 | Wollitzer | H04B 3/52 |
| 2004/0106331 | A1 * | 6/2004 | Hoegener | H05K 7/1481 439/551 |
| 2019/0360242 | A1 * | 11/2019 | Robertson | E05B 81/14 |
| 2022/0165531 | A1 * | 5/2022 | Steinberger | H02B 1/056 |

* cited by examiner

APPARATUS FOR LATCHING AND UNLATCHING AN ELECTRICAL FUNCTION-RELATED MODULE AND METHOD FOR UNLATCHING AN ELECTRICAL FUNCTION-RELATED MODULE

PRIORITY CLAIM

This application claims priority to European Application No. 23168091.9, filed on Apr. 14, 2023. The disclosure of this application is specifically incorporated herein by reference.

FIELD OF THE INVENTION

The invention relates to an apparatus for latching and unlatching an electrical function-related module to a current busbar module and a method for unlatching and/or latching an electrical function-related module from a current busbar module.

BACKGROUND OF THE INVENTION

Current busbar modules can comprise one or more current busbars for supplying power to electrical devices. The devices can be divided into an electrical function-related module, which performs the actual task of the device, and an apparatus for latching and unlatching the function-related module to the current busbar module.

There exist already a large number of latching and unlatching systems, as well as a variety of different current busbar modules. The safety of the user is always central. In particular, although a latched device should be relatively easy to unlatch, it should not be able to come off by itself. In addition, it is advantageous if the unlatching process only occurs when using a tool and, by contrast, the latching (or latching on) is done without a tool. It is also preferable if a latching and unlatching system can be used in a variety of ways.

It is therefore an objective of the present invention to create an apparatus for latching electrical function-related modules to current busbar modules, which is easy to latch, remains reliably latched and is easy to unlatch, whereby unlatching should preferably only be possible with the aid of a tool. In addition, a method is to be created by means of which a device can be easily unlatched from a current busbar module.

SUMMARY OF THE INVENTION

According to the invention, these tasks are solved by the objects of the independent patent claims.

Accordingly, the invention provides an apparatus for latching and unlatching an electrical function-related module to/from at least one retaining opening of a current busbar module, comprising:

- a first latching device and a second latching device, each latching device having at least one latching tooth insertable into the at least one retaining opening for latching the electrical function-related module;
- wherein the at least one latching tooth of the first latching device and the at least one latching tooth of the second latching device face away from each other and are movable away from each other function-related module to engage behind the at least one retaining opening for latching the electrical function-related module and are movable towards each other for unlatching the electrical function-related module;
- a first carriage element movable linearly along a first axis of movement;
- a second carriage element, which movable linearly along a second axis of movement, which is arranged perpendicular to the first axis of movement;
- a first mechanical conversion device configured to convert a linear movement of the first carriage element along the first axis of movement into a linear movement of the second carriage element along the second axis of movement; and
- a second mechanical conversion device, which is configured to convert the linear movement of the second carriage element along the second axis of movement into a movement of the latching teeth, which belong to different latching devices, towards or away from each other.

The aforementioned elements and devices can preferably each be formed in one piece, wherein non-conductive elements and devices may be formed from a plastic, for example.

The apparatus preferably comprises a housing, and the electrical function-related module to be latched may particularly preferably be arranged inside the housing. It can be mechanically fastened there and/or electrically connected to connection terminals of the apparatus. An apparatus according to the invention, which comprises the electrical function-related module, is also referred to herein as an "electrical device".

Although the function-related module and the apparatus for latching the function-related module are often described herein as being separate, it shall be understood that in many embodiments these can also be configured as being fixedly connected to one another and the distinction is therefore only functional or serves to simplify the explanation.

In particular, latching means, that the apparatus in the latched state (i.e. the latched apparatus) cannot be unlatched from the current busbar module without the operation of a mechanism and/or the use of a tool. In the unlatched mode, by contrast, simple unlatching from the current busbar module is possible, in particular by simply pulling the apparatus directly off the current busbar module. Latching to the current busbar module may also be referred to as locking to the current busbar module, and unlatching as unlocking.

A significant advantage of the ideas according to the invention is that a simple mechanical actuation of the first carriage element, for example with the aid of a tool, with a single simple movement along an axis of movement, is converted purely mechanically into a latching or unlatching movement of latching teeth. A housing of the apparatus may be configured in such a way that a typical tool—such as a screwdriver—can be used as a lever to actuate the first carriage element in order to make actuation particularly simple.

According to some preferred embodiments, variants or refinements of embodiments, the first mechanical conversion device includes a first inclined portion on the first carriage member (or: of the first carriage member) having a first predefined inclination with respect to the first axis of movement, and a second inclined portion on the second carriage member (or: of the second carriage member) having the first predefined inclination with respect to the first axis of movement. The second inclined section may preferably rest against or be put up against the first inclined section in such a way that a linear movement of the first carriage element along the first axis of movement causes a linear movement of the second carriage element along the second axis of movement, in particular mechanically and automatically. This results in a simple and space-saving, yet very effective conversion of forces.

According to some preferred embodiments, variants or refinements of embodiments, the latching devices and the second mechanical conversion device are configured such that the latching teeth are moved towards or away from each other on a curved path or are movable relative to each other on curved paths. In other words, the latching devices can be rotated, for example by angles between 10° and 90°. This allows the apparatus to be configured to save space. This mechanism may also be referred to as a "rotary solution".

According to some preferred embodiments, variants or refinements of embodiments, the latching devices are each individually arranged to rotate about a common axis of rotation, which preferably extends within both the first and the second latching device. The second mechanical conversion device may be configured to convert the linear movement of the second carriage element into rotational movements of the latching devices towards or away from each other, respectively. This may render the apparatus even more space-saving.

According to some preferred embodiments, variants or refinements of embodiments, the second mechanical conversion device includes at least one plunger portion on the second carriage member and at least one shoulder portion on at least one latching device. Each plunger portion may be arranged and configured in such a way that, when the second carriage element moves along the second axis of movement, it exerts a torque on a respective shoulder portion on the latching device containing the shoulder portion in a direction away from the first carriage element. The second conversion device may be configured symmetrically with respect to the two latching devices, so that both are subjected to the same torque and thus rotated simultaneously and to the same extent.

According to some preferred embodiments, variants or refinements of embodiments, the latching devices and the second mechanical conversion device are configured in such a way that the latching teeth may be moved towards and away from each other in a linear movement. This mechanism may be referred to as a "linear solution".

According to some preferred embodiments, variants or refinements of embodiments, the second mechanical conversion device includes at least one third inclined portion on the second carriage member (or: of the second carriage member) having a second predefined inclination with respect to the second axis of movement and at least one fourth inclined portion on at least one latching device (or: of at least one latching device) having the second predefined inclination with respect to the second axis of movement. Each third inclined section may preferably rest against a respective fourth inclined section in such a way that a linear movement of the second carriage element along the second axis of movement in a direction facing away from the first carriage element is converted into a movement of the latching device, comprising the respective fourth inclined section, along the first axis of movement. In particular, the linear movements of the latching devices may be symmetrical with respect to a plane of symmetry arranged between the latching devices.

According to some preferred embodiments, variants or refinements of embodiments, the apparatus additionally comprises a pre-load element, in particular a spring element, which is arranged and configured to exert a reciprocal pre-load on the latching devices, which favors the movement of the latching teeth away from each other. This means that the force exerted by the pre-load element must be overcome first in order to unlatch, which makes the latching more secure.

According to some preferred embodiments, variants or refinements of embodiments, each latching device has a spring receptacle. The spring receptacles are configured to at least partially receive and fasten the pre-load element configured as a spring element. If the pre-load element is not configured as a spring element, the spring receptacle may also be referred to as a pre-load element receptacle. Alternatively, the spring element may also be integrated into the latching device in a suitable manner. For example, a molded and thus integral, elastic geometrical section may be provided on one or more latching device(s), which acts as a pre-load element, in particular as a spring element.

According to some preferred embodiments, variants or refinements of embodiments, a function-related terminal for the electrical (or: galvanic) contacting and/or mechanical locking (or: fastening) of the function-related module is formed on one side of the first and second carriage element and at least one connection terminal is formed on the other side of the first and second carriage element, which is configured and arranged to be in electrical contact with a current busbar of the current busbar module when the apparatus is latched to the current busbar module. The function-related terminal and connection terminals can be manufactured in one piece from an electrically conductive material, in particular copper or a copper alloy, or can also be made in several parts and connected to each other.

According to some preferred embodiments, variants or refinements of embodiments, the at least one connection terminal is substantially flat and arranged parallel to the latching teeth, which are preferably also flat.

According to some preferred embodiments, variants or refinements of embodiments, the at least one connection terminal and the latching teeth are arranged and configured in such a way that they can be inserted simultaneously into different holding slots of a row of current-carrying holding slots arranged in parallel as retaining openings of the current busbar module. This results in a wide variety of connection options for the apparatus (or electrical device) at positions along the current busbar module.

According to some preferred embodiments, variants or refinements of embodiments, the apparatus comprises a function-related module electrically connectable and/or mechanically lockable (or: fastened) to the function-related terminal, or at least one function-related terminal to which the function-related module is electrically connectable and/or mechanically lockable or fastenable. As mentioned above, the apparatus comprising the function-related module may also be referred to as an electrical device.

According to some preferred embodiments, variants or refinements of embodiments, the function-related module is configured as a power feed-in module and/or as an electrical component and/or as an electronic component. Such a power feed-in module may, for example, be configured with a frame clamp, with a prismatic or lug terminal clamp, with a tension clamp, with one or more clamping bolts, and/or with a stud bolt, this list being non-exhaustive. The electrical component may be, for example, a fuse holder, a switch, a switch disconnector, a switch disconnector with fuses or a fuse switch disconnector, this list being also non-exhaustive. The electronic components may be, for example, a power supply unit, an overvoltage protection device or a motor starter, this list also being non-exhaustive.

The apparatus may be configured as a single-pole apparatus or as a multi-pole apparatus and can be used, for example, for single-pole or multi-pole feed-in into the current busbar module.

The invention also provides a system comprising a current busbar module and an apparatus according to the invention (or an electrical device according to the invention).

The invention also provides a method for unlatching an electrical function-related module from at least one retaining opening of a current busbar module, the method comprising at least the steps of:

- moving a first carriage element of an apparatus, which is latched to the current busbar module by engaging behind a retaining opening of the current busbar module on both sides by at least two latching teeth facing away from each other and which has a function-related terminal to which the electrical function-related module is fastened, in a linear movement along a first axis of movement which is arranged perpendicular to a longitudinal extent of the current busbar module;
- moving, as a mechanically automatic response to the movement of the first carriage member, a second carriage member along a second axis of movement which is perpendicular to the first axis of movement; and
- moving, as a mechanical-automatic reaction to the movement of the second carriage element, the latching teeth facing away from each other move towards each other so that the latching teeth no longer engage behind the retaining opening on both sides, as a result of which the apparatus is unlatched from the current busbar module.

Further advantageous options, modifications, variations and refinements result from the following from the description of the attached figures.

BRIEF DESCRIPTION OF THE FIGURES

The invention is explained in more detail below with reference to examples of embodiments in the figures of the drawings. They show.

In all figures, identical or functionally identical elements and apparatuses have been given the same reference signs, unless otherwise indicated. The designation and numbering of the process steps does not necessarily imply a sequence, but serves the purpose of better differentiation, although in some variants the sequence may also correspond to the sequence of the numbering.

DETAILED DESCRIPTION

Figure 1:
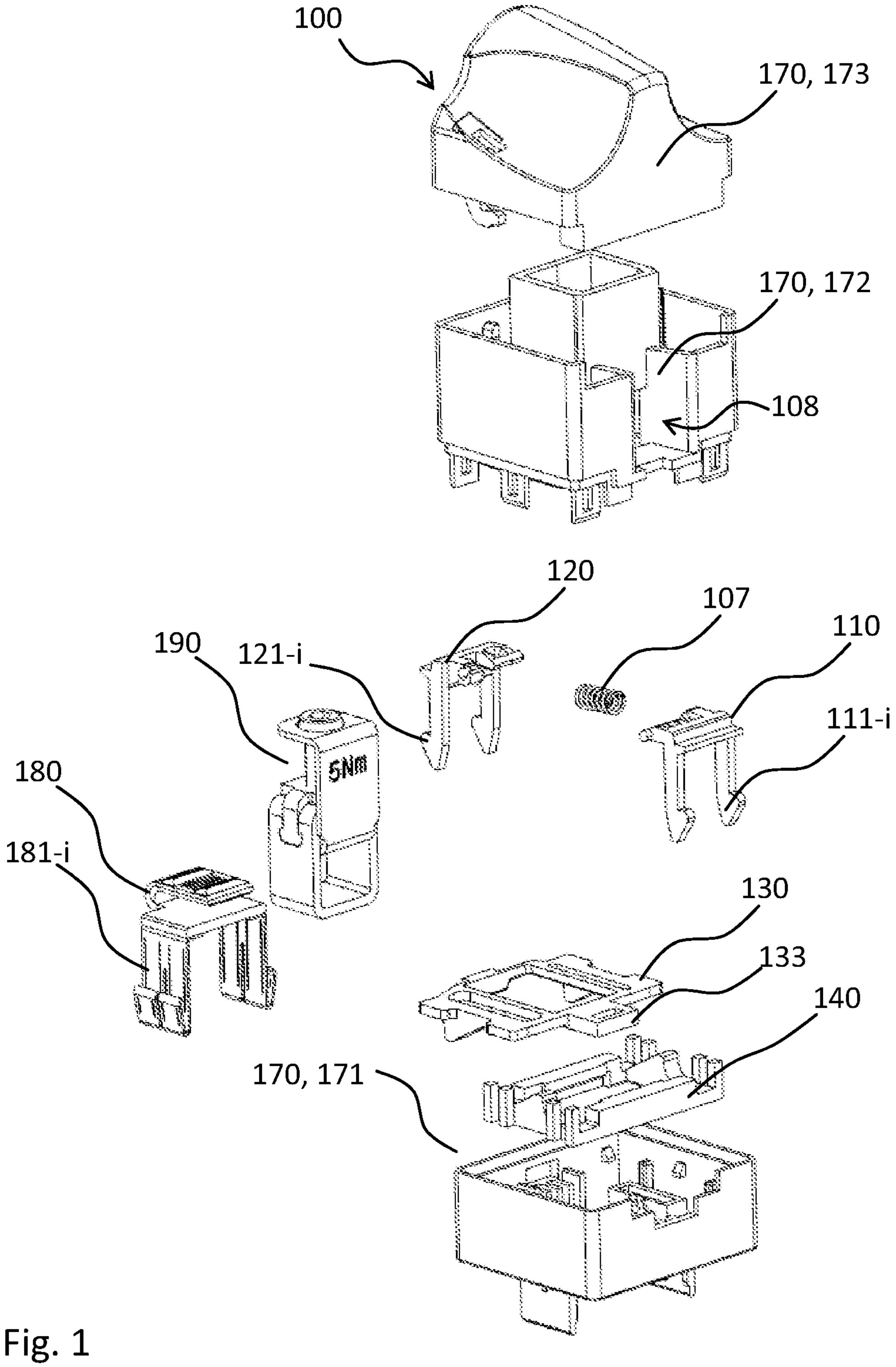
FIG. 1 is a schematic exploded view of parts of an apparatus according to an embodiment of the present invention.

FIG. 1 shows a schematic exploded view of parts of an apparatus 100 according to one embodiment of the present invention, i.e. an apparatus for latching and unlatching a—in particular electrical—function-related module 190 to at least one retaining opening of a current busbar module.

The apparatus 100 may comprise or consist of the components shown in FIG. 1. In particular, the apparatus 100 may include the function-related module 190 (here: a frame clamp).

Some components of the apparatus 100 are first described in an overview with reference to FIG. 1, before the details of the invention and possible options, modifications and refinements are explained in more detail with reference to the following figures.

According to FIG. 1, the apparatus 100 comprises a housing 170, which here exemplarily consists of three parts: a lower shell 171, which is configured to come into contact with the current busbar module, an upper shell 173, and a middle piece 172 arranged therebetween. An insertion opening 108 is formed in the middle piece 172, through which, for example, a current-carrying conductor can be inserted and attached to the function-related module 190, for example for feeding an electric current to a current busbar of the current busbar module.

Two latching devices 110, 120 are provided for latching the apparatus 100 to the at least one retaining opening. Each of the latching devices 110, 120 has two elongate, flat and parallel latching elements, each of which ends in a latching tooth 111-*i*, 121-*i*. The latching teeth 111-*i*, 121-*i* serve to engage behind the retaining opening while the apparatus 100 is latched to the current busbar module, as will be explained in more detail below.

A pre-load element 107, here for example configured as a helical spring, is used to apply a latching pre-load to the latching device 110, 120.

The apparatus 100 further comprises a first carriage element 130 and a second carriage element 140, which are arranged in the lower shell 171. At this point, it is worth mentioning a first actuating element 133 arranged on the first carriage element 130, by means of which the apparatus 100 in the latched state can be unlatched again.

A function-related terminal 180 is used for the electrical, and here also mechanical, connection of the function-related module 190 to connection terminals 181-*i*, which, when the apparatus 100 is latched to the current busbar module, are in electrical contact with the current busbar. Thus, there is an electrical path between the current busbar, the connection terminals, function-related terminal 180, the function-related module 190 and possibly also a conductor inserted into the function-related module 190 through the insertion opening 108. In the present case, the function-related terminal 180 and the connection terminals 181-*i* are manufactured in several parts, with the connection terminals 181-*i* (preferably configured in one part) being attached, preferably welded, to a function-related terminal 180 (preferably configured in one part) (see also FIG. 18 and the associated description). The connection terminals 181-*i* and the function-related terminal 180 may alternatively also be configured in one piece. Preferably, the connection terminals 181-*i* are configured with a leaf spring function, so that the connection terminals 181-*i*, inserted into a current-carrying slot, press against it on both sides.

It will be understood that the insertion opening 108 may also be configured to receive an adapter or another electrical function-related module or electrical device, such as a measuring device, a communication device, a display, a user interface, and/or the like.

Figure 2:
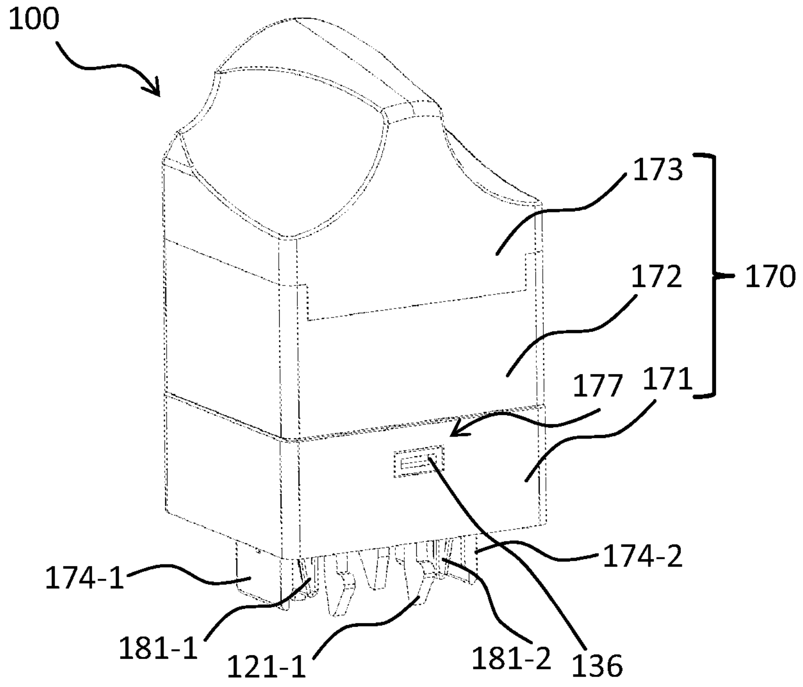
FIG. 2 is a schematic oblique view of the apparatus from FIG. 1 in assembled condition.

FIG. 2 shows the apparatus 100 in an assembled state, from a side facing away from the insertion opening 108. A second actuating element 136 of the first carriage element 130 is visible at a rear (relative to the insertion opening 108) opening 177 in the lower shell 171.

Without limiting the generality, the side of the apparatus 100 on which the insertion opening 108 is located will hereinafter be referred to as the "front side", and the side facing away from this will be referred to as the "rear side". Accordingly, terms such as "at the front side" or "at the rear side" will be used. Terms such as "top" and "bottom" (for example for upper shell 173 and lower shell 171) or "above" or "below" refer to distances from the current busbar module 1, which is defined as being arranged "at the bottom". However, it shall be understood that the apparatus 100 may also be arranged in any other orientation. In reality, the current busbar modules 1 are usually attached to a wall, but thanks to the locking mechanism according to the invention, they may also be arranged upside down.

Also clearly recognizable are lateral protective walls 174-1, 174-2, which are a (preferably integral) part of the lower shell 171 and protect the connection terminals 181-*i* and the latching elements in particular from bending or breaking off when the apparatus 100 is removed from the current busbar module.

Figure 3:
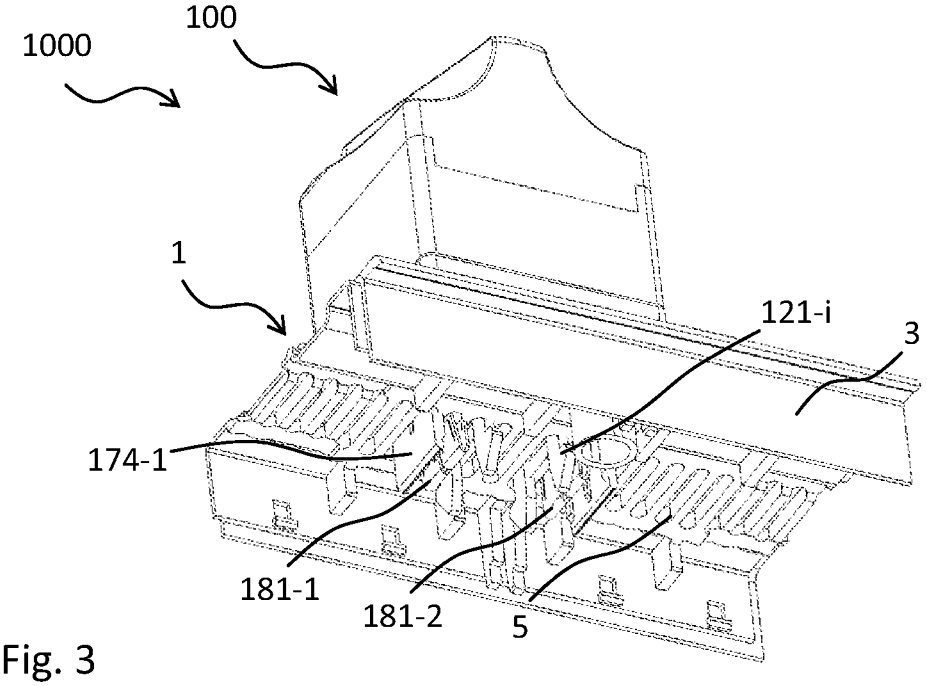
FIG. 3 is a schematic oblique view of the apparatus in FIG. 1 while it is engaged with a current busbar module.

FIG. 3 shows the apparatus 100 as it is latched to a current busbar module 1. The current busbar module 1 comprises a slotted contact protection bar 3 and a slotted busbar surrounded on three sides by it, the slots of contact protection bar 3 and busbar being aligned with one another. Such a current busbar 2 is shown, for example, in FIG. 20, although the present invention is not limited to use with slotted current busbars 2.

Accordingly, FIG. 3 also shows a system 1000 according to the invention comprising the apparatus 100 (with or without function-related module 190) and a current busbar module 1. In the embodiment shown, a plurality of retaining openings 5 of the current busbar module 1 are provided, which are formed as a plurality of mutually parallel retaining slots in the current busbar 2. Advantageously, the retaining slots in the current busbar 2 serve not only as retaining openings 5, but also as electrical receptacles for the connection terminals 181-*i*.

In other variants, however, electrical receptacles on the one hand and retaining openings on the other may also be configured separately from each other. For example, the current busbar module 1 could be configured with a greater distance between the contact protection busbar 3 and the current busbar 2. The retaining openings 5 could be formed by the slots in the contact protection busbar 3, and the electrical receptacles could continue to be formed by the slots in the current busbar 2.

The system 1000 shown in FIG. 3, or the configuration of the apparatus 100 shown here, has the particular advantage that the apparatus 100 can be inserted and latched at any point along the current busbar module 1, since the protective walls 174-*i*, the connection terminals 181-*i*, and the latching devices are all configured with a thickness less than the slot width of the slots in the current busbar 2, and can therefore be inserted into any slots.

FIG. 3 also clearly shows how the latching teeth 121-*i* would engage behind the slots in a current busbar 2 inserted in the contact protection busbar 3 (not shown in FIG. 3, but may be seen as an example in FIG. 20) on both sides (i.e. at both longitudinal ends of the slots). This means that the apparatus 100 cannot simply be pulled out of the current busbar 2 in this state. For this purpose, the opposing latching teeth facing away from each other at both ends of the slots must be moved towards each other so that the latching teeth no longer engage behind the slots.

Figure 4:
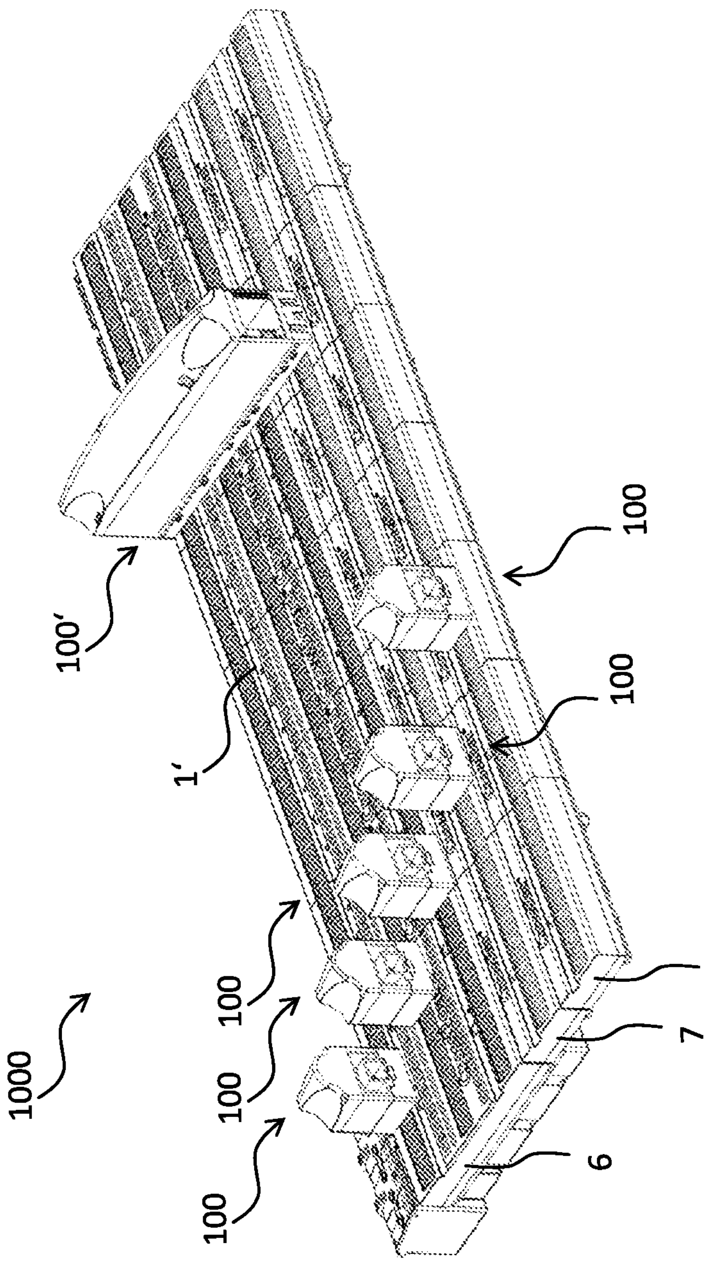
FIG. 4 is a schematic oblique view of an exemplary busbar module with five busbars, to which six apparatuses according to the invention are latched, and thus also of a system according to a further embodiment of the present invention.

FIG. 4 shows an example of a current busbar module 1' with a 5-pole design, i.e. with five busbars 2. This comprises a three-row component 6 with three busbars and integrated contact protection bars, in this case the so-called CROSSBOARD®, as well as two single-row components 7, each with a current busbar and a contact protection bar, in this case the so-called CROSSBAR®, flanged onto it.

On the current busbar module 1' thus formed, five of the single-pole devices 100 are arranged and latched, one at each pole. It is easy to see how clear a cable routing can be achieved by aligning the devices 100 with their insertion openings 108 all in the same direction and latching them slightly offset along the rail axis (i.e. the longitudinal extension of each busbar individually), so that a cable tree can be electrically connected to all poles of the current busbar module 1' in an orderly and space-saving manner.

The right-hand side of FIG. 4 shows by way of example that devices 100' according to the invention may of course also be configured with multiple poles (here: four poles). Latching may take place on selected rows (e.g. the first and the last) or on all rows.

FIG. 4 thus also shows a system 1000 according to a further embodiment of the present invention, which comprises a current busbar module 1' and (at least) one apparatus 100; 100' according to the invention.

Figure 5:
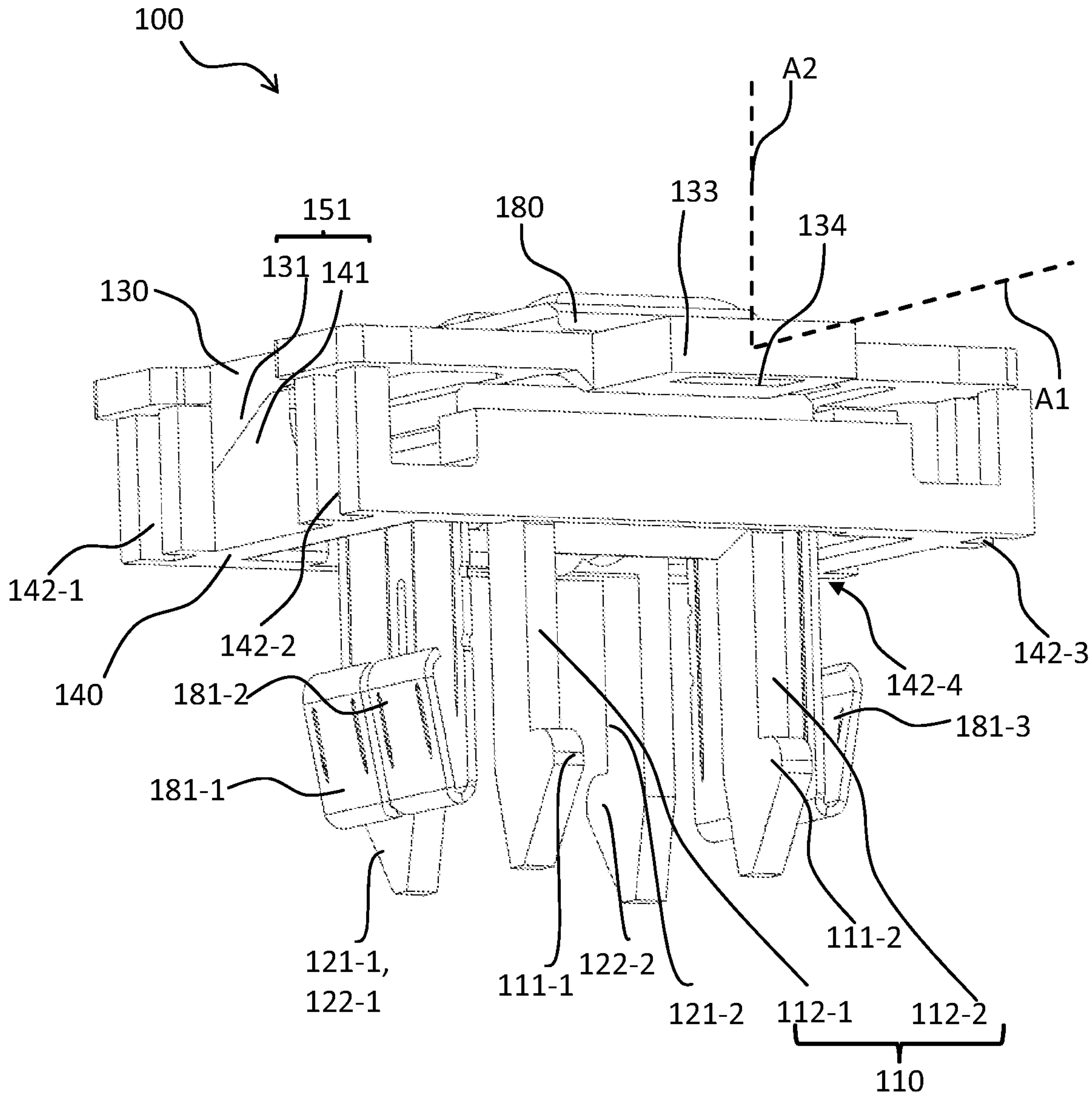
FIG. 5 to FIG. 10 are schematic oblique views of individual parts of the apparatus from FIG. 1 for a more detailed explanation.

FIG. 5 now shows a detailed view of some components of the apparatus 100 to illustrate the latching and unlatching mechanism. The first actuating element 133 can be seen protruding from the image plane, with a slot 134 formed therein, into which, for example, a slot screwdriver can be inserted in order to move the first actuating element 133 along a first axis of movement A1, in this case: to pull it out of the image plane. In the middle piece 172 of the housing 170, also a recess is provided for this purpose in a base section facing the lower shell 171, so that the slot 134 for a screwdriver is accessible through the insertion opening 108 and this recess. This is also clearly visible in FIG. 1 on the front side (i.e. the side with the insertion opening 108) of the devices 100.

The first carriage element 130, which preferably—including the first actuating element 133—is formed in one piece, is mounted so as to be linearly movable along the first axis of movement A1, for example in the lower shell 171 of the housing 170, and preferably movable only along this axis of movement A1. This means that the first carriage element 130 is in particular also prevented from moving along a second axis of movement A2, which is perpendicular to the first axis of movement A1, for example by corresponding projections in the middle piece 172 of the housing 170 and/or a shoulder in the lower shell 171. The first carriage element 130 is also prevented from moving along a third axis of movement perpendicular to the axes of movement A1, A2 by guides or side walls in the lower shell 171.

To clarify the axes of movement, it is helpful to imagine that the substantially flat first carriage element 130 lies substantially in a plane which is spanned by the first axis of movement A1 and the third axis of movement (along which, however, advantageously nothing moves in the apparatus 100). The connection terminals 181-*i* and the latching elements 112-*i*, 122-*i*, on the other hand, lie essentially in planes which are parallel to a plane which is spanned by the first axis of movement A1 and the second axis of movement A2. The first, second and third axes of movement thus correspond to an orthogonal tripod.

For cases in which the insertion opening 108 is difficult to access or is occupied, an opening 177 is provided in the lower shell 171 at the rear side, via which a blind slot formed in the rear side of the first carriage element 130 is accessible as a second actuating element 136. This second actuating element 136 can be pressed inwards, for example by means of a slot screwdriver, in order to move the first carriage element 130 forwards along the first axis of movement A1.

Furthermore, it can be seen in FIG. 5 that on the first carriage element 130 (at least) one first inclined section 131 is formed, which has an inclination (between 0° and 90°, preferably between 20° and 70°) relative to the first axis of movement A1. More precisely, the (at least one) first inclined section 131 has a flat surface which is tilted by the said inclination relative to a plane in which the first actuating element 133 moves during its actuation.

FIG. 5 also shows that on the second carriage element 140 (at least) one identical second inclined section 141 is formed, i.e. which thus has the same inclination as the (at least one) first inclined section 131 of the first carriage element 130, but whose surface normal points in the opposite direction to that of the first inclined section 131. In the situation shown in FIG. 5, the (at least one) first and the (at least one) second inclined section 131, 141 are (in each case) exactly adjacent to one another.

In the embodiment of the apparatus 100 shown, the first carriage element 130 has two first inclined sections 131, one on each side of the actuating element 133. Similarly, the second carriage element 140 has two second inclined sections 141 adjacent to the first inclined sections. Due to the symmetry, this improves the mechanical actuation of the carriage elements 130, 140, as described below. It shall be understood that only a single inclined section 131, 141, or more than two inclined sections, may also be provided per carriage element 130, 140, advantageously, for example, one pair of inclined sections 131, 141 per opposing pair of latching teeth and/or per pole of the current busbar module 1' against which the apparatus 100; 100' rests.

In the apparatus 100, the second carriage element 140 is arranged below the first carriage element 130, i.e. closer to the latching teeth 111-*i*, 211-*i* and the connection terminals 181-*i*, between the first carriage element 130 and the lower shell 171. The second carriage element 140 has four guide grooves 142-1, 142-2, 142-3, 142-4 on the outside, for example formed by double brackets. The second carriage element 140 is guided by the four guide grooves 142-*i* in such a way that it can move exclusively along the second axis of movement A2, i.e. in FIG. 5 exclusively upwards and downwards. Since the second carriage element 140 rests at the top against the first carriage element 130, in particular with its second inclined sections 141 against its first inclined sections 131, it can only move away from the first carriage element 130, i.e. downwards in FIG. 5.

It can now be seen very clearly in FIG. 5 that the first inclined sections 131 and the second inclined sections 141 together form a first mechanical conversion device 151: when the first actuating element 133 is pulled, the first inclined sections 131 of the first carriage element 130, which is secured against movement along the second axis of movement A2, press against the second inclined sections 141 of the second carriage element 140, which is secured against movement along the first axis of movement A1. As a result, the first converting device 151 converts the linear movement of the first carriage element 130 along the first axis of movement A1 into a linear movement of the second carriage element 140 along the second axis of movement A2 of the second carriage element 140: the second carriage element 140 is pushed away from the first carriage element 130 in the direction of the connection terminals 181-*i* (downwards in FIG. 5). In the further extent of the description, it will become clear how this also causes the apparatus 100 to unlatch.

Before that, it should be mentioned with regard to FIG. 5 that it can be seen there that each of the latching devices 110, 120 has two elongate, flat latching elements 112-1, 112-2, 122-1, 122-2, which each, at their ends facing away from the carriage elements 130, 140 end in a respective latching tooth 111-1, 111-2, 121-1, 121-2. The latching elements 112-1, 112-2, 122-1, 122-2 within a latching device 110, 120 are each configured and arranged parallel to and congruent with one another, so that they can engage simultaneously in the slots of the contact protection bar 3 and/or the current busbar 2, which are arranged parallel to one another.

One latching element 112-1, 112-2 of the first latching device 110 and one latching element 122-1, 122-2 of the second latching device 120 respectively are each arranged with their flat bodies in the same plane, so that they can both engage in the same slot of the contact protection bar 3 and/or the current busbar 2, so that the two latching teeth 111-*i*, 121-*i* pointing away from each other can engage behind the respective slot on both sides. The latching teeth 111-*i*, 121-*i* of two different latching devices 110, 120 interacting in this way are also referred to below as "opposing" (in addition to "interacting").

The pre-load element 107 is arranged to press these interacting latching teeth 111-*i*, 121-*i* of two different latching devices 110, 120 away from each other. The latching elements 112-*i*, 122-*i* and in particular the latching teeth 111-*i*, 121-*i* are tapered at the bottom with outward-facing bevels. With these tips, the latching elements 112-*i*, 122-*i* can be inserted into the slots of the current busbar module 1 even without actuating the actuating element 133. By applying force to the apparatus 100 in the direction of the current busbar module 1, the bevels of the latching teeth 111-*i*, 121-*i* then cause the opposing latching teeth 111-*i*, 121-*i* to move towards each other until they are close enough to each other so that they can pass completely through the slot. Due to the pre-load by the pre-load element 107, they will then move apart, engage behind the slot on both sides and thus latch the apparatus 100. The latching is thus advantageously possible without tools.

Figure 6:
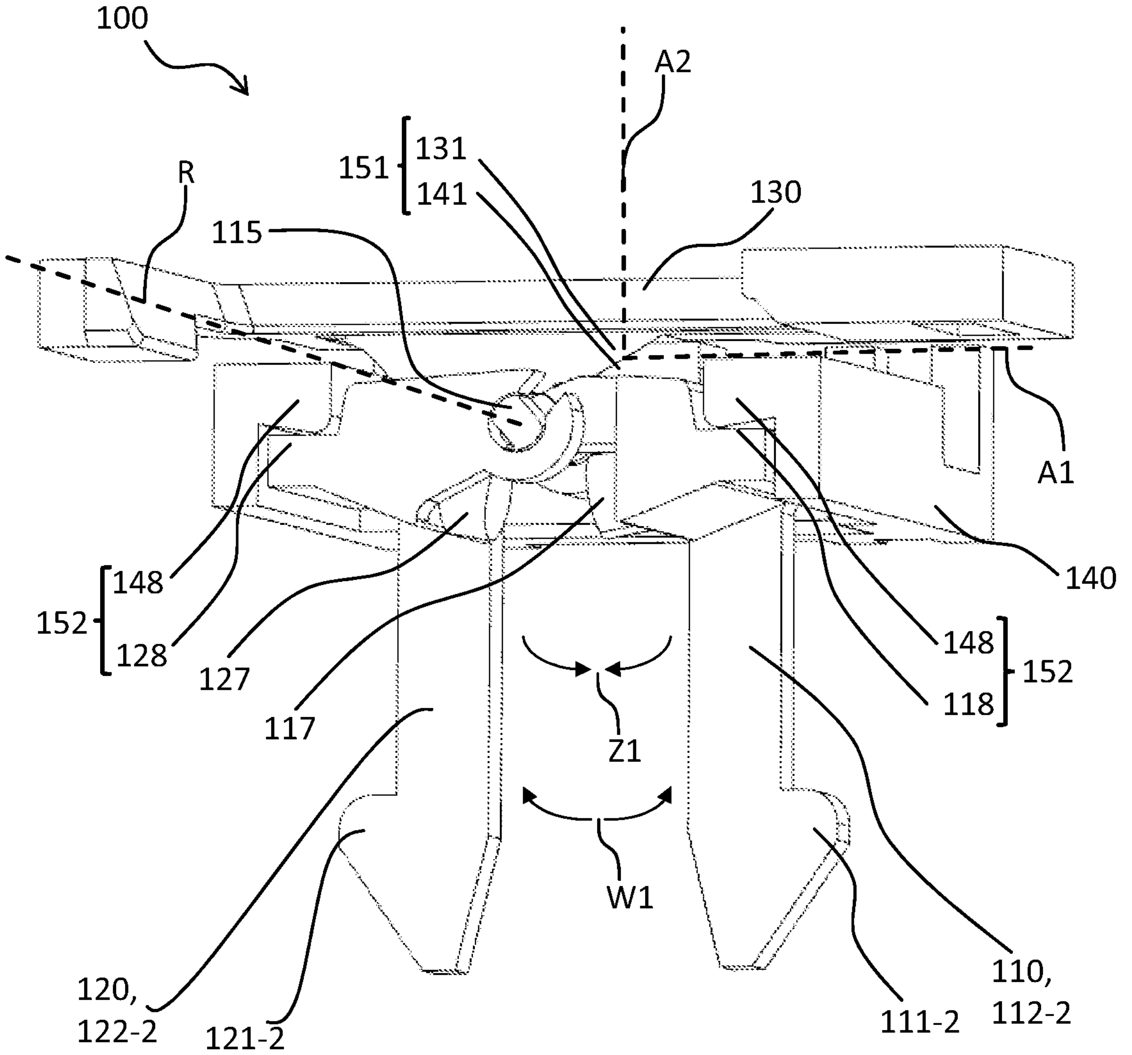

FIG. 6 shows in detail, in a cross-sectional representation, how the linear movement of the second carriage element 140 is converted by a second mechanical conversion device 152 into a movement of the respective opposing and cooperating latching teeth 111-2, 121-2 towards each other Z1 or away from each other W1.

The second mechanical conversion device 152 includes at least one plunger portion 148 on the second carriage member 140 and at least one shoulder portion 118, 128 on at least one latching device 110, 120, wherein each plunger portion 148 is arranged and configured such that, when the second carriage member 140 is moved along the second axis of movement A2 in a direction away from the first carriage member 130, it exerts a torque on a respective shoulder portion 118, 128 on the latching device 110, 120 which includes the shoulder portion 118, 128.

The latching devices 110, 120 are each individually arranged to rotate about a common axis of rotation R. In the apparatus 100, each latching device 110 has its own shoulder portion 118, 128, which are each arranged and formed at the base of the latching elements 112-*i*, 122-*i* and facing away from the axis of rotation R. The second carriage element 140 has two plunger portions 148, one of which rests against each of the shoulder portions 118, 128.

When the second carriage element 140 moves downwards along the second axis of movement A2 (i.e. away from the first carriage element 130), the plunger portions 148 press on the shoulder portions 118, 128. The torque exerted in this way causes the latching elements 112-*i*, 122-*i* to rotate towards each other, so that the latching teeth 111-*i*, 121-*i* are moved towards each other on a curved movement, as indicated by Z1 in FIG. 6.

Each latching device 110, 120 has a spring receptacle 117, 127, between which the pre-load element 107, which is configured as a helical spring, is enclosed in order to exert a preload on the latching devices 110, 120 in a direction away from each other (designated W1 in FIG. 6). By pulling on the first actuating element 133 (and/or by pressing the second actuating element 136), the respective interacting latching teeth 111-*i*, 121-*i* thus move towards each other (Z1) against the spring force of the pre-load element 107. The distance between the latching teeth 111-*i*, 121-*i* thus becomes so small at some point that they no longer engage behind the retaining opening 5 on both sides (or no longer at all), and the apparatus 100 is thus in the unlatched state.

In this way—by simply actuating the first and/or the second actuating element 133, 136—the apparatus 100 can be unlatched.

Figure 7:
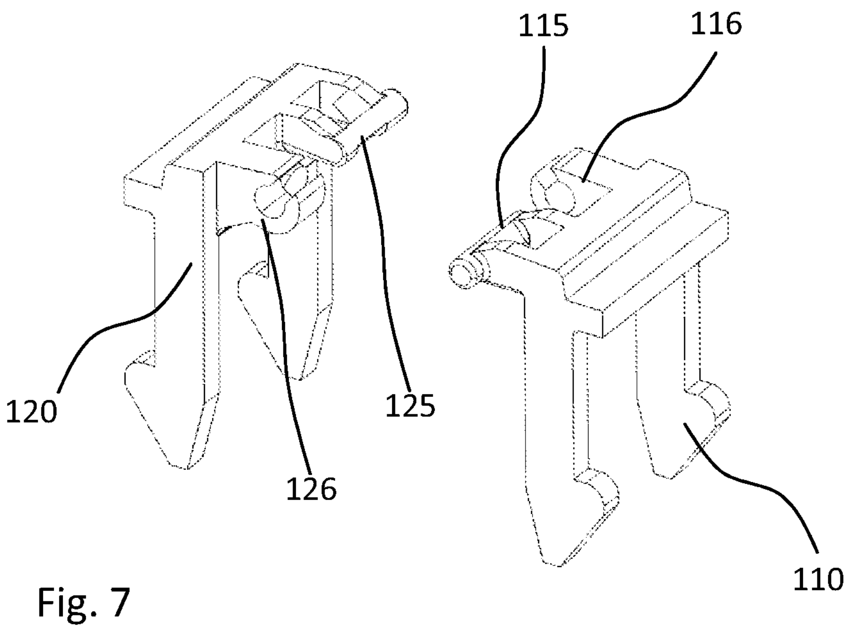

FIG. 7 shows an advantageous embodiment of the latching devices 110, 120. As can be seen there, each latching device 110, 120 has a shaft section 115, 125 and a bearing section 116, 126 aligned therewith, such that each bearing section 116, 126 can in each case partially receive and support the shaft section 125, 115 of the other latching device 120, 110. The bearing sections 116, 126 can be configured such that the shaft sections 115, 125 can be clipped into them. In particular when the latching devices 110, 120 are each manufactured in one piece from a plastic material, simple assembly is thus possible.

In the present case, the connection is advantageously configured according to the pipe wrench principle: the shaft sections 115, 125 each have along their circumference both two circular arc-shaped sections and two straight sections parallel to one another. The bearing sections 116, 126 have an inlet at one point along their circumference, into which a respective shaft section 115, 125 can be inserted (if and only if) its parallel straight sections are arranged essentially parallel to the insertion direction of the inlet. This can be clearly seen in FIG. 6, where a state is shown in which the shaft section 115 is rotated by approximately 90° relative to its direction of insertion into the bearing section 126. Due to the second carriage element 140 and/or the second mechanical conversion device 152, the latching devices 110, 120, once they are supported in one another and in the lower shell 171 (see also FIG. 8 and the following associated description), can advantageously no longer be deflected (or rotated with respect to one another) to such an extent that the parallel sections of the shaft sections 115, 125 come to lie parallel to the direction of insertion of the corresponding shaft sections 115, 125 again. Compared to the single-clip solution, the solution based on the pipe wrench principle is even more robust, even when the latching devices are subjected to heavy loads. Due to the form fit of the bearing, materials other than plastic are also possible, although plastic is preferred.

Figure 8:
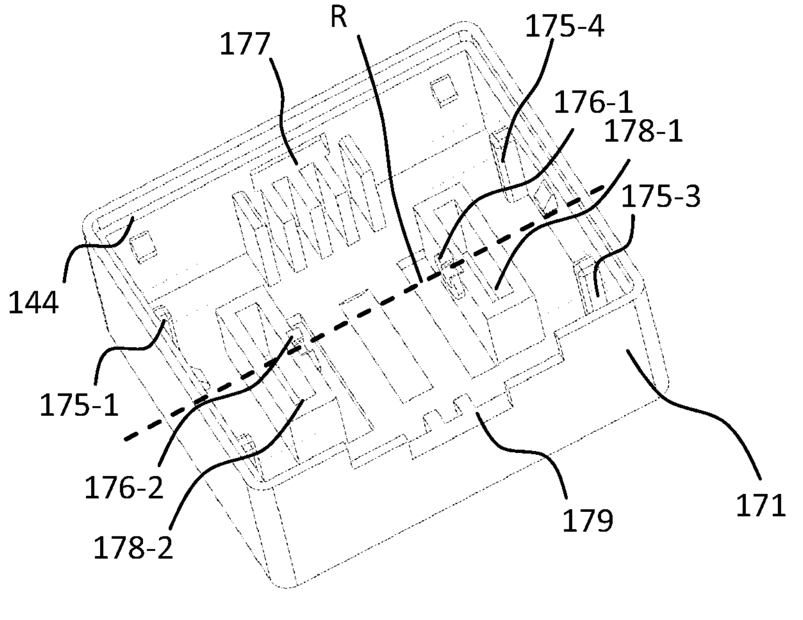

FIG. 8 shows a schematic oblique view of the lower shell 171 from above. Two superstructures are arranged symmetrically on the inside at the bottom of the lower shell 171, each of which has a bearing section 176-1, 176-2 on a side facing one another. Each of the bearing sections 176-*i* partially accommodates one of the bearing sections 116, 126 of the latching devices 110, 120, so that the latching devices 110, 120 are thus suspended on the lower shell 171—rotatable about the axis of rotation R (or: rotational axis). In addition, a slot 178-1, 178-2 is formed in each of the superstructures, passing through the bottom of the lower shell 171. The connection terminals 181-*i* are guided through these slots 178-*i* to the underside of the lower shell 171.

Also clearly recognizable in FIG. 8 is the recess 179 (or: nook) in the lower shell 171, in which the first actuating element 133 is arranged prior to its actuation, preferably without protruding in front of the outer wall of the lower shell 171. Through the recess 179, the first actuating element 133 can also be completely or partially pulled out of the lower shell 171 during its actuation. The opening 177 in the lower shell 171, through which the second actuating element 136 can be actuated from the outside, is also visible.

Four guide ridges 175-*i* are also arranged on the inside of the outer wall of the lower shell 171, which are surrounded by the guide grooves 142-*i* of the second carriage element 140 in order to guide the latter. In addition, on the inside of the outer wall of the lower shell 171, an almost completely circumferential shoulder 144 is formed, on which the first carriage element 130 is mounted and is prevented from moving along the second and third axes of movement by the outer wall. The upward movement of the first carriage element 130 is limited by the middle piece 172 of the housing 170, which can be clipped into snap-in nipples on the inside of the outer wall of the lower shell 171 using the tabs clearly visible in FIG. 1. Two of the snap-in nipples can be seen in FIG. 8 on the inner wall of the rear wall of the lower shell 171.

Figure 9:
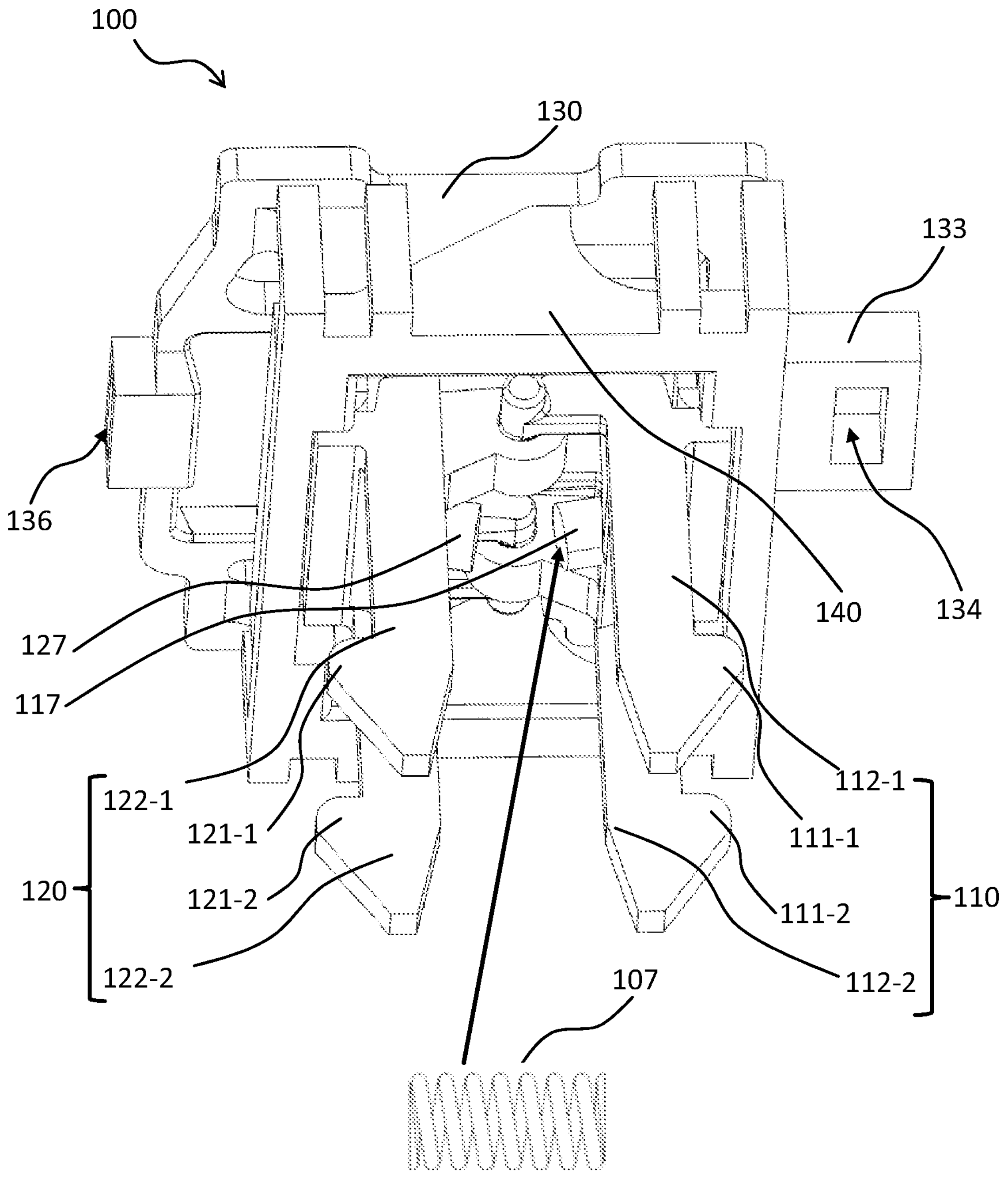

FIG. 9 again shows the arrangement of the latching devices 110, 120 in interaction with the first carriage element 130 and the second carriage element 140 from below.

Figure 10:
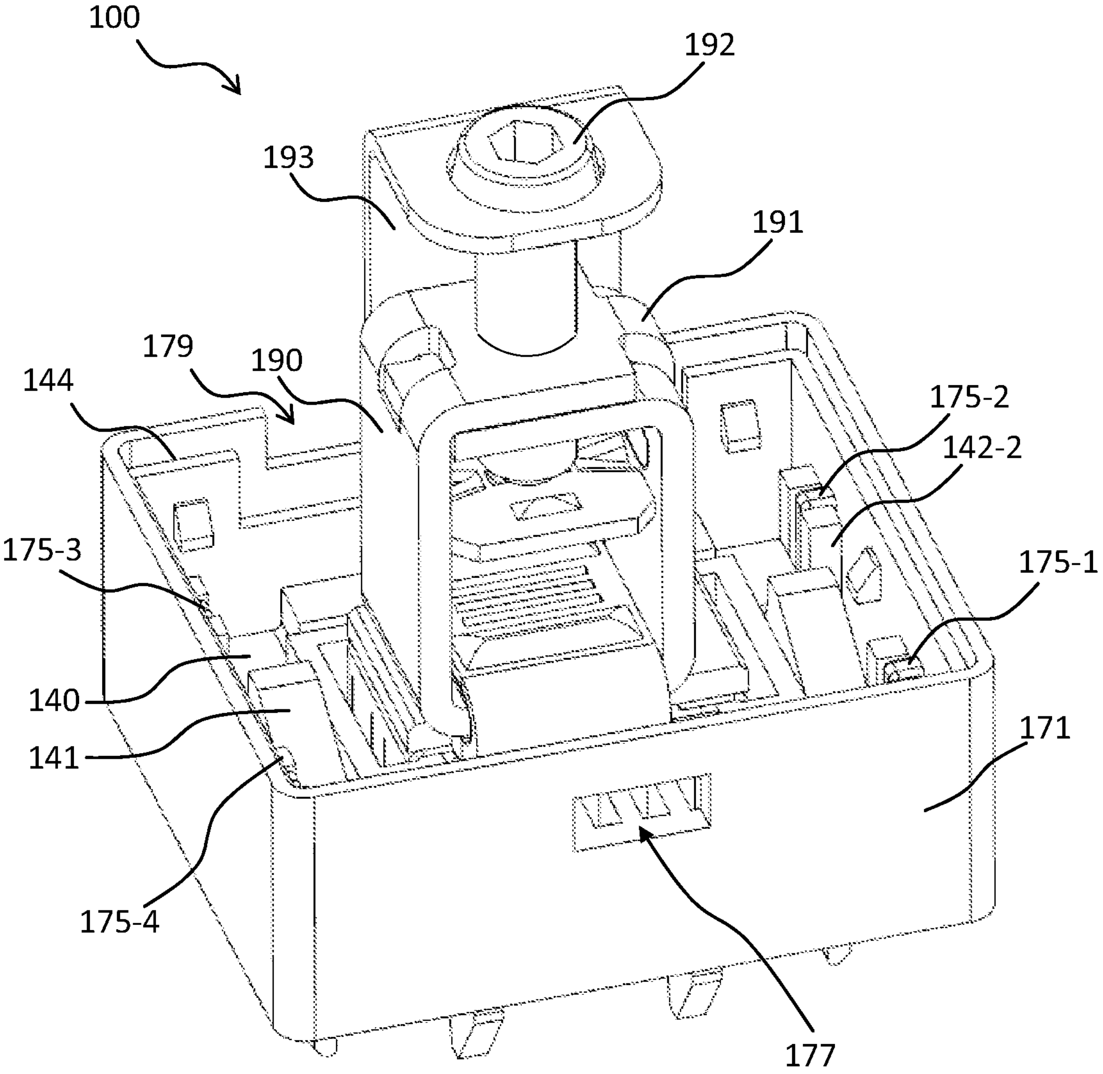

FIG. 10 shows the function-related module 190, in this case a frame clamp 191, as it is arranged with the function-related terminal 180, and thus mechanically and electrically connected to the apparatus 100. As can be clearly seen in FIG. 1, the function-related terminal 180 has a connection bracket that emerges tangentially from a base plate, from which the connection terminals 181-*i* also emerge, and is bent back over the base plate. FIG. 1 shows how the frame clamp 191 is inserted between the base plate and the connecting bracket. By means of a screw 192 and a wire protection bracket 193, a conductor inserted through the insertion opening 108 can be securely and stably connected electrically and mechanically to the apparatus 100.

The housing 170, in particular its middle piece 172, may be adapted to the respective function-related module 190. As can be seen in FIG. 1, the middle piece 172 has a tower-like superstructure, which encloses the frame clamp 191 on four sides and leaves an opening at the top through which the screw 192 can be screwed on or off.

Figure 11:
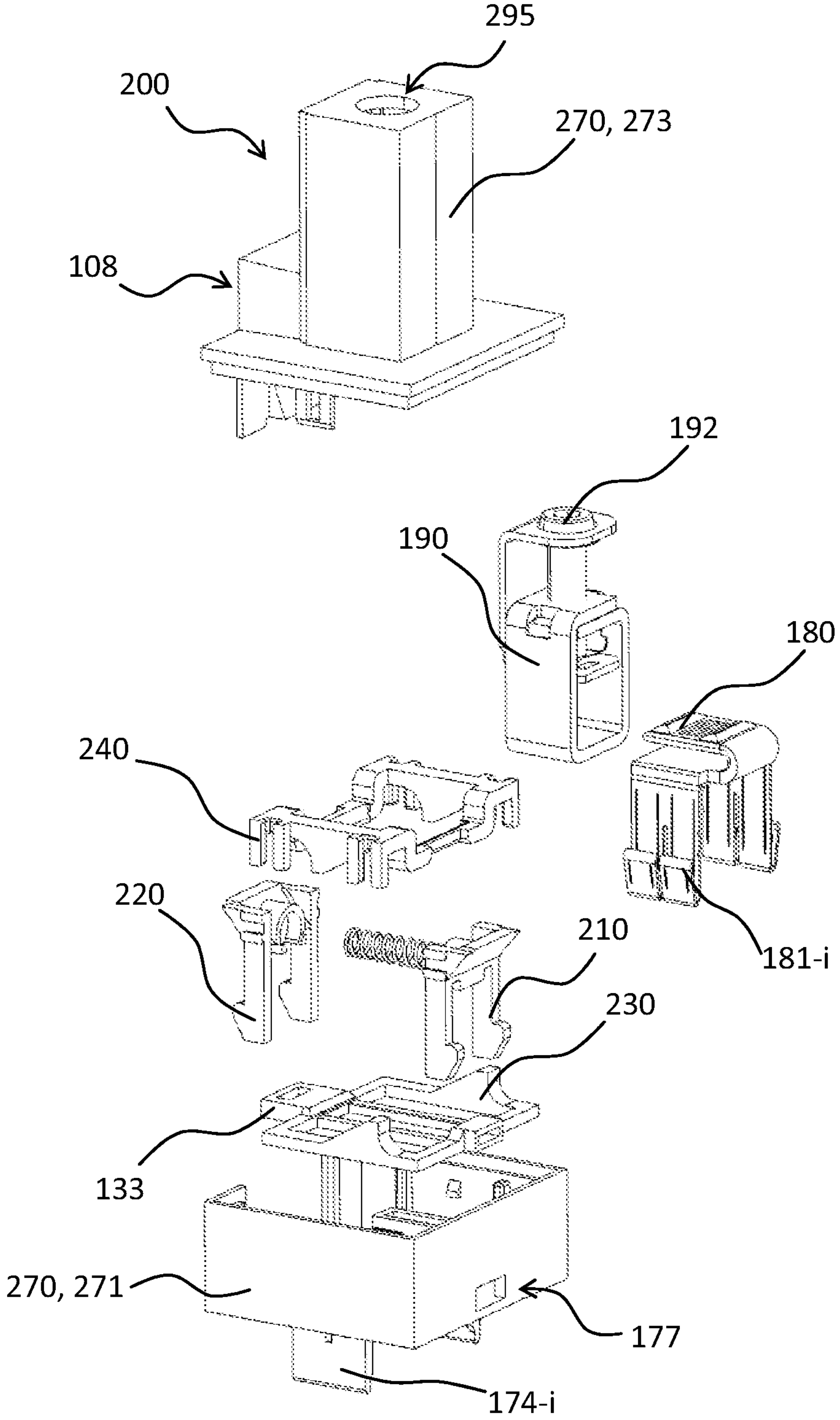
FIG. 11 is a schematic exploded view of parts of an apparatus according to a further embodiment of the present invention.

FIG. 11 shows a schematic exploded view of parts of an apparatus 200 according to a further embodiment of the present invention, i.e. a further apparatus for latching and unlatching a—in particular electrical—function-related module 190 to at least one retaining opening 5 of a current busbar module 1; 1'.

The apparatus 200 is a variant of the apparatus 100 and differs from the latter primarily in that in the apparatus 200 the latching devices 210, 220 do not move towards and away from each other on a curved path (i.e. by respective rotations about the common center of rotation R), but on linear paths. Accordingly, many components of the apparatus 200 are similar to those of the apparatus 100, so that in the following, primarily the differences are discussed. Some largely or completely, geometrically or functionally, identically configured components will be designated with the same reference signs as in apparatus 100, while others will be given new reference signs, without necessarily having to be configured differently as a result. It shall be understood that the system 1000 according to the invention may also comprise one or more of the devices 200, or completely different embodiments of the present invention.

According to FIG. 11, the apparatus 200 comprises a housing 270, which consists of a lower shell 271 and an upper shell 273 that can be clipped into it. A tower-like superstructure of the upper shell 273 is exposed in this embodiment, so that a screw hole 295 on its upper side provides access to the screw 192 arranged on the inside.

One difference to the apparatus 100 is that in the apparatus 200 the first carriage element 230, i.e. the one which is moved (e.g. by means of the first actuating element 133) by a user to unlatch the apparatus 200, is arranged between the lower shell 271 and the second carriage element 240. In the apparatus 100, the second carriage member 140 was disposed between the lower shell 171 and the first carriage member 130. Accordingly, in the mechanism of the apparatus 200, the second carriage element 240 is also pushed upwards by the first carriage element 230 to unlatch the apparatus 200, i.e. away from the lower shell 271. The mechanism will be explained in more detail below.

However, it shall be understood that also in the apparatus 200, the second carriage element 240 may be arranged between the first carriage element 230 and the lower shell 171 and/or may be pressed downwards by the first carriage element 230 towards the lower shell 271 for unlatching. Similarly, in the apparatus 100, the first carriage element 130 may also be arranged between the lower shell 171 and the second carriage element 140 and/or the second carriage element 140 may be pressed upwards, i.e. away from the lower shell 171, by the first carriage element 130 for unlatching. After reading the present teaching, it is clear to the person skilled in the art how the respective conversion devices can be slightly modified for this purpose.

Figure 12:
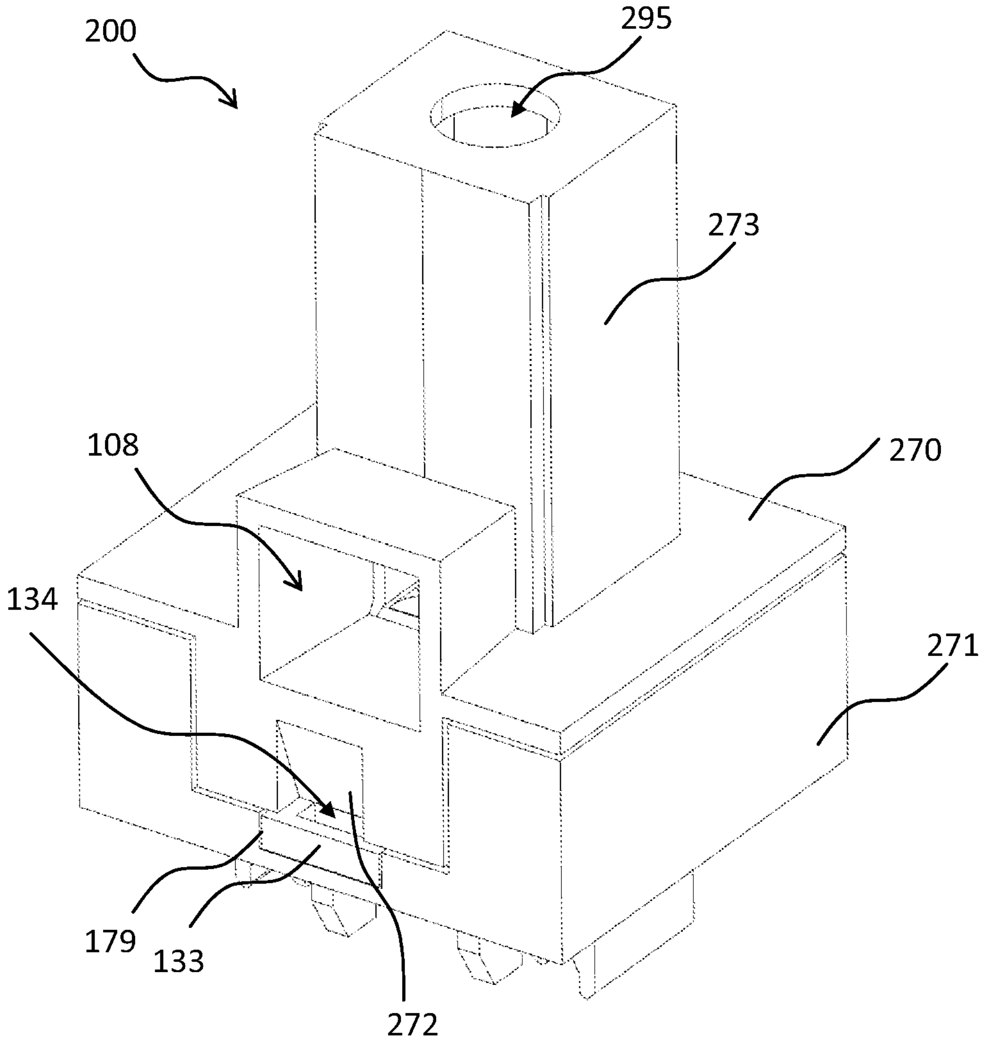
FIG. 12 is a schematic oblique view of the apparatus from FIG. 11 in an assembled state.

FIG. 12 shows the apparatus 200 at an angle from its front side, i.e., the side with the insertion opening 108. The lower shell 271 also has a recess 179 in its front side to receive the first actuating element 133 and to allow the first actuating element 133 to be pulled out of the lower shell 271. A bevel 272 in the top shell 273 adjacent to the recess 179 allows a slotted screwdriver to be easily inserted into the slot 134 of the first actuator 133 and levered against the bevel 272 to more easily pull or push out the first actuator 133.

Figure 13:
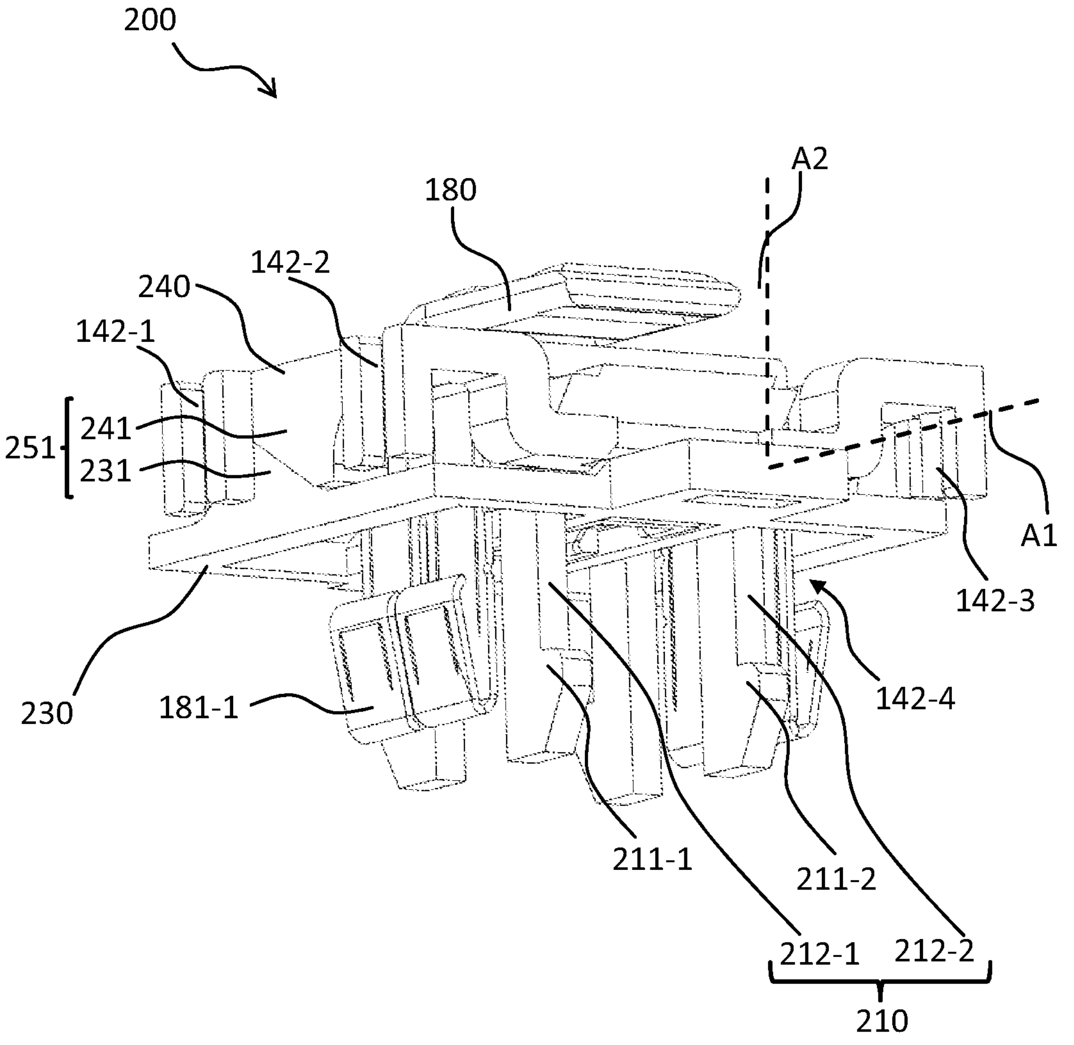
FIG. 13 to FIG. 18 are schematic oblique views of individual parts of the apparatus in FIG. 11 for a more detailed explanation.

FIG. 13 illustrates the mode of operation of the first mechanical conversion device 251 of the apparatus 200: Here, too, the first carriage element 230 and the second carriage element 240 each have at least one (here: two) inclined section 231, 241 which rest against each other. In contrast to the apparatus 100, however, the first carriage element 230 is located at the bottom here, so that it presses the second carriage element 240 upwards in the direction of the function-related terminal 180 during linear movement along the first axis of movement A1 out of the drawing plane.

Figure 14:
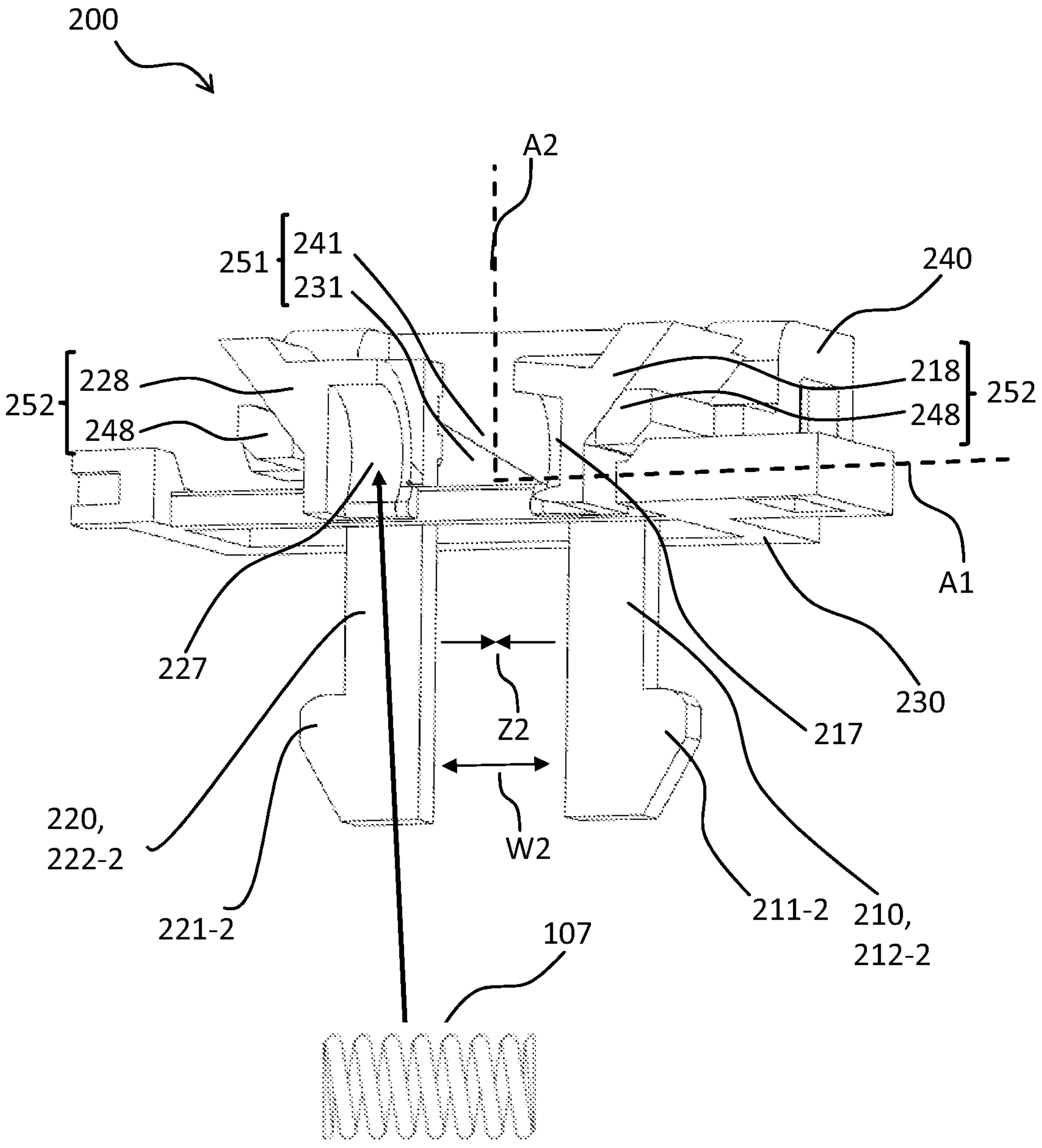

FIG. 14 shows a schematic cross-sectional view for further explanation of the unlatching mechanism of the apparatus 200. In the apparatus 200, the latching devices 210, 220 each have a third inclined section 218, 228 at their base ends (i.e. at the ends facing away from the latching teeth 211-*i*, 221-*i*). This consists in each case of a surface inclined relative to the plane in which the first actuating element 133 moves. A fictitious mirror plane can be drawn between the interacting latching teeth 211-*i*, 221-*i* of the two latching devices 210, 220 and between the two third inclined sections 218, 228.

In each case, a fourth inclined section 248 of the second carriage element 240 is located on the outside of the third inclined sections 218, 228. The third and fourth inclined sections 218, 228, 248 together form a second mechanical conversion device 252 of the apparatus 200. As with the first mechanical conversion device 251, the inclined sections 218, 248 and 228, 248 are also adjacent to one another in the second mechanical conversion device 252.

If the second carriage element 240 is now pressed upwards along the second axis of movement A2, the upward movement of the latching devices 210, 220 is limited by the base plate of the function-related terminal 180. The second mechanical conversion device 252 thus causes the two latching devices 210, 220 to move linearly towards each other, as indicated by Z2 in FIG. 14. For this purpose, the latching devices 210, 220 can advantageously be guided by guides to a linear movement along the first axis of movement A1.

Between a respective spring receptacle 217, 227 of the latching devices 210, 220 there is again arranged and enclosed a pre-load element 107, such as a helical spring 107, which exerts a preload against the movement Z2, i.e. which pushes the latching devices 210, 220 away from each other, as indicated by W2 in FIG. 14. The user must therefore work against the pre-load of the pre-load element 107 when actuating, i.e. moving, the first carriage element 230 to unlatch the apparatus 200.

Figure 15:
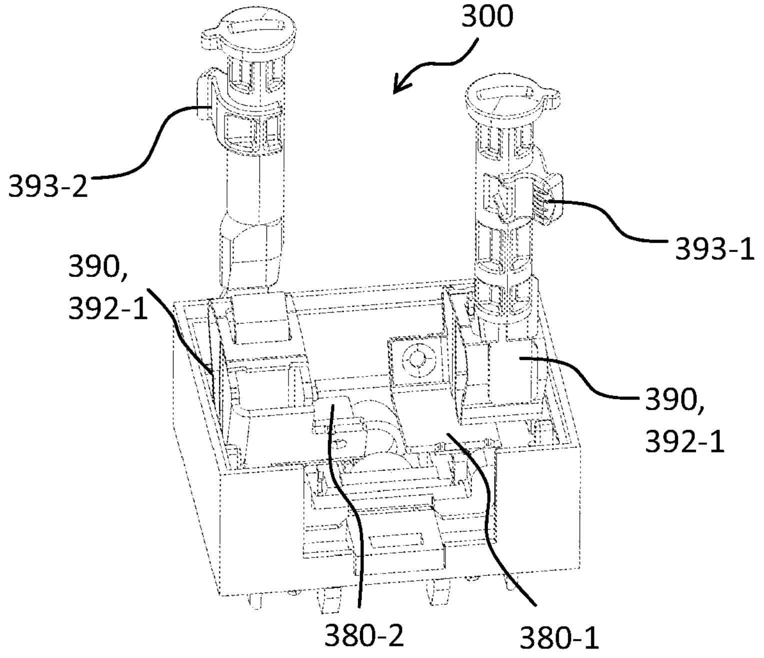

FIG. 15 shows an apparatus 300 according to a further embodiment of the present invention. The apparatus 300 is a variant of the apparatus 200 and differs from the latter essentially in that the function-related module 390, which here is also a power feed-*in* module that is to be latched to the current busbar module 1, has two tension clamp terminals 392-1, 392-2. Instead of a common base plate, each tension clamp terminal 392-1, 392-2 is electrically connected via a respective function-related terminal 380-1, 380-2 to two connection terminals on one side of the latching devices. Each tension clamp terminal 392-1, 392-2 can be opened via a corresponding actuating element 383-1, 393-2.

It shall be understood that the function-related module 390 may also be formed with only one tension clamp terminal 392-*i*, and that instead of the mechanics of the apparatus 200 with linear movement Z2, W2 of the latching devices 210, 220, the mechanics of the apparatus 100 with the rotational movement Z1, Z1 of the latching devices 110, 210 may preferably also be provided, i.e. that the apparatus 300 may also be formed as a variant of the apparatus 100.

Figure 16:
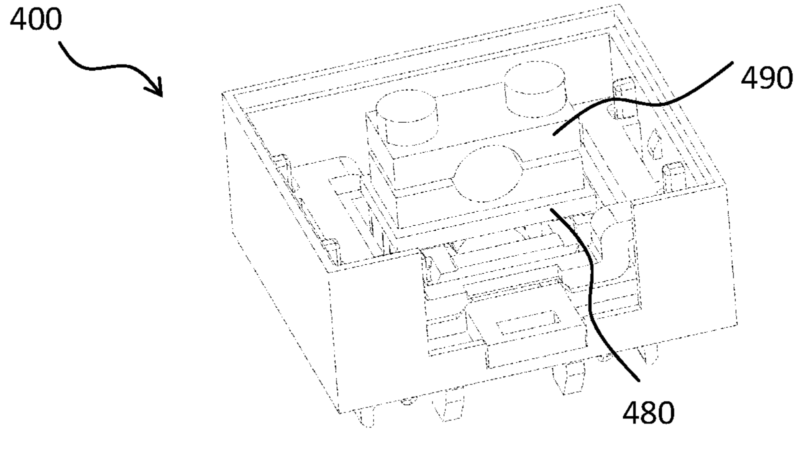

FIG. 16 shows an apparatus 400 according to a further embodiment of the present invention. The apparatus 400 is a variant of the apparatus 200 and differs therefrom essentially in that the function-related module 490 of the apparatus 400 is configured as a power feed-in module with a clamp terminal, which is electrically and physically connected to a base plate of a function-related terminal 480 of the apparatus 400.

It shall be understood that the apparatus 400 may also be formed as a variant of the apparatus 100, i.e. with rotational movement Z1, W1 of the latching devices 110, 210.

Figure 17:
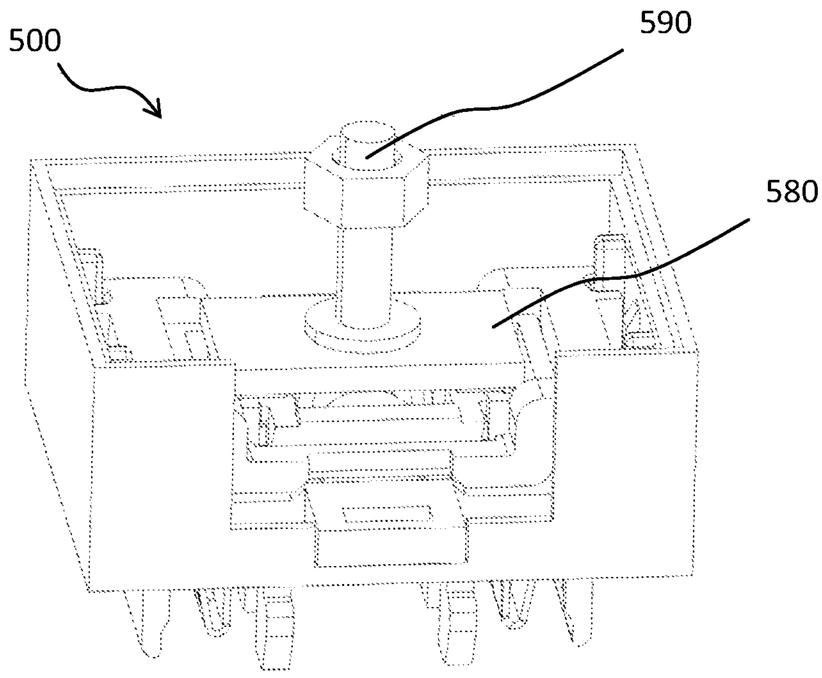
Figure 18:
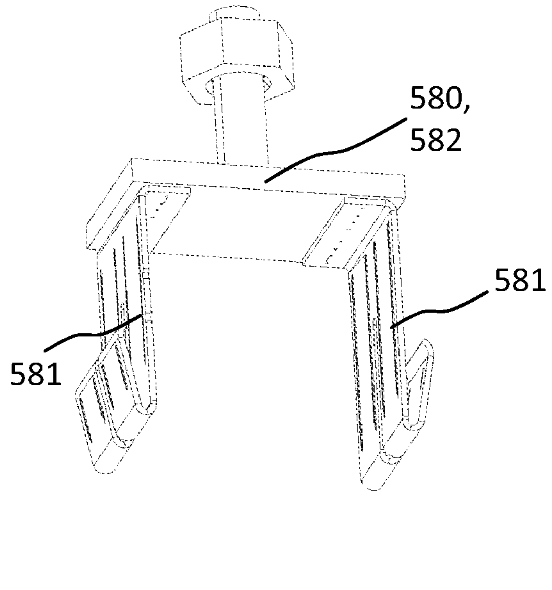

FIG. 17 shows an apparatus 500 according to a further embodiment of the present invention, with FIG. 18 showing details in isolation. The apparatus 500 is a variant of the apparatus 200 and differs from the latter essentially in that the function-related module 590 of the apparatus 500 is a power feed-in module with a stud bolt, which is electrically/galvanically connected to a base plate 582 of the function-related terminal 580 of the apparatus 500. An associated cable lug can be connected to the stud bolt with the aid of the nut.

FIG. 18 shows that in this embodiment, but also in others, the individual connection terminals (here: connection terminals 581) can each be physically and galvanically connected to a bent flange at the bottom of the base plate 582 of the function-related terminal 580, preferably via a substance-to-substance-bonded welded connection.

It shall be understood that the apparatus 500 may also be formed as a variant of the apparatus 100, i.e. with rotational movement Z1, W1 of the latching devices 110, 210.

Figure 19:
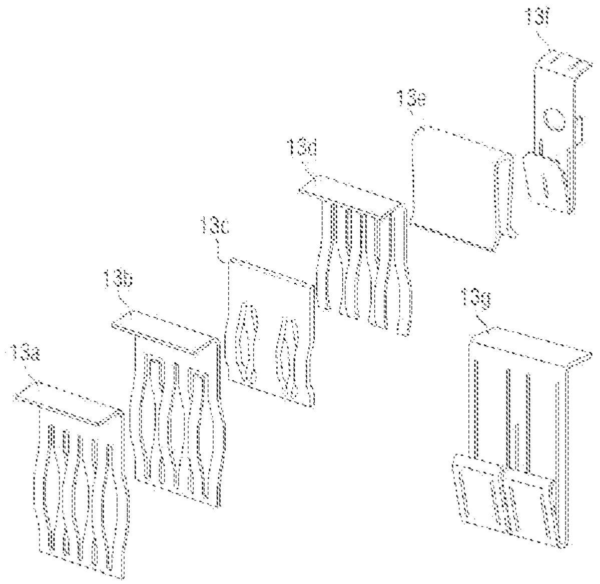
FIG. 19 are schematic views of various possible designs of connection terminals for the apparatuses according to the invention.

FIG. 19 shows various possible embodiments 13*a*-13*g* of the connection terminals 181-*i*, as they can be used in the various devices 100-500. In the foregoing, connection terminals 181-*i* of embodiment form 13*g* were shown, but all other embodiment forms 13*a*-13*f* shown and also embodiment forms not shown are also possible.

Figure 20:
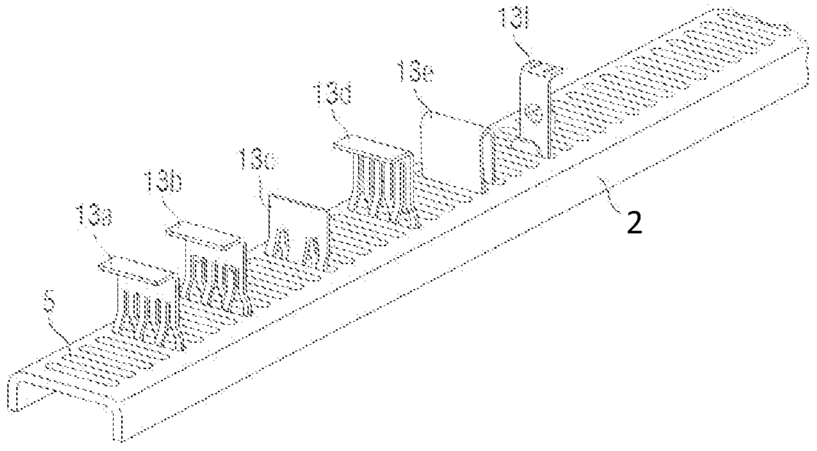
FIG. 20 is a depiction of the connection terminals from FIG. 18, as they electrically contact a current busbar.

FIG. 20 shows how the various embodiment forms 13*a*-13*g* of the connection terminals 181-*i* can be inserted into the retaining openings of a slotted busbar 2 of a current busbar module 1. The current busbar 2 may comprise a U-shaped cross-section, as shown in FIG. 19, or may also be flat. Other cross-sectional shapes are also possible, for example O-shaped cross-sections, whereby the two ends are almost brought back together except for a narrow gap.

Figure 21:
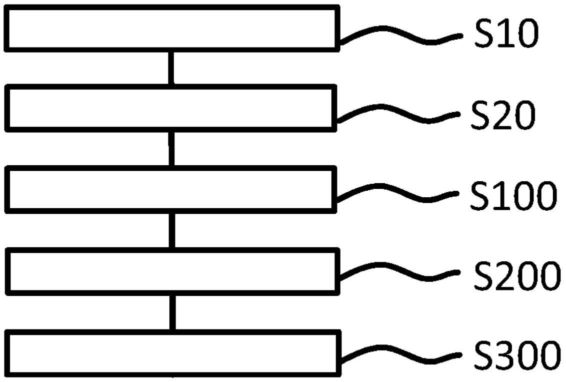
FIG. 21 is a schematic flow chart for explaining a method according to still another embodiment of the present invention.

FIG. 21 shows a schematic flowchart explaining a method according to a further embodiment of the present invention, i.e. a method for unlatching an apparatus 100-500 on a current busbar module 1. The method is particularly performable with a device according to an embodiment of the present invention, preferably with one of the devices 100-500, but also independently thereof. Therefore, the method according to the invention is adaptable according to all options, variants and refinements described with respect to the device according to the invention and vice versa.

In a step S100, a user moves a first carriage element 130; 230 of an apparatus 100-500, which is latched to the current busbar module 1 by engaging behind a retaining opening 5 of a current busbar module 1 on both sides by at least two latching teeth 111-*i*, 121-*i*; 211-*i*, 221-*i* on the current busbar module 1 and which apparatus 100-500 has a function-related terminal 180; 380-*i*; 480; 580, to which the electrical function-related module 190; 390; 490; 590 is fastened, in a linear movement along a first axis of movement A1, which is arranged perpendicular to a longitudinal extent of the current busbar module 1.

As a mechanically-automatic reaction to this, in a step S200 a second carriage element 140; 240 is moved along a second axis of movement A2, which is perpendicular to the first axis of movement A1, which in turn mechanically-automatically causes latching teeth 111-*i*, 121-*i*; 211-*i*, 221-*i* facing away from each other to move towards each other Z1, Z2 in a step S300, so that the latching teeth 111-*i*, 121-*i*; 211-*i*, 221-*i* no longer engage behind the retaining opening 5 on both sides, as a result of which the apparatus 100-500 is unlatched from the current busbar module 1.

The method may further comprise steps for latching and thus be a method for latching and/or unlatching a function-related module 190; 390; 490; 590 with a current busbar module 1.

For latching, as already described below, the apparatus 100-500 can be inserted with the tips of the latching elements 112-*i*, 122-*i*; 212-*i*, 222-*i* into the retaining opening 5 and pressed in the direction of the current busbar module 1 in order to move the latching elements 112-*i*, 122-*i*; 212-*i*, 222-*i* towards each other (Z1, Z2) against the pre-load of the pre-load element 107 until the latching teeth 111-*i*, 121-*i*; 211-*i*, 221-*i* have passed the edge of the retaining opening 5 and move away from each other due to the pre-load W1, W2 and engage behind the retaining opening 5 on both sides.

LIST OF REFERENCE SYMBOLS

1 busbar module
2 busbar
3 touch protection bar
5 retaining opening
6 3-rowed component of the current busbar module
7 1-rowed extension components
13 embodiment forms of contact terminals
100 apparatus
100' apparatus
107 pre-load element
108 introduction opening
110 first latching device
111-*i* latching teeth of the first latching device
112-*i* latching elements of the first latching device
115 shaft section of the first latching device
116 bearing section of the first latching device
117 spring receptacle of the first latching device
118 plunger sections
121-*i* latching teeth of the second latching device
122-*i* latching elements of the second latching device
125 shaft section of the second latching device
126 bearing section of the second latching device
127 spring receptacle of the second latching device
130 first carriage element
131 first inclined portion
134 slot
136 second actuating element
140 second carriage element
141 second inclined portion
142-*i* guide grooves
144 shoulder
148 plunger portions
151 first mechanical conversion device
152 second mechanical conversion device
170 housing
171 lower shell of the housing
172 middle piece of the housing
173 upper shell of the housing
174-*i* protective walls
175-*i* guide ridges

176 storage sections
177 opening
178-*i* slot
179 recess
180 function-related terminal
181-*i* connection terminal
190 function-related module
191 frame clamp
192 screw
193 wire guard
200 apparatus
210 first latching device
211-*i* latching teeth of the first latching device
212-*i* latching elements of the first latching device
217 spring receptacle
218 third inclined portion
121-*i* latching teeth of the second latching device
222-*i* latching elements of the first latching device
227 spring receptacle
228 third inclined portion
230 first carriage element
231 first inclined portion
240 second carriage element
241 second inclined portion
248 fourth bevel cut
251 first mechanical conversion device
252 second mechanical conversion device
270 housing
271 lower shell
272 bevel
273 upper shell
291 screw
295 screw hole
300 apparatus
380-*i* function-related terminals
390 function-related module
392-*i* tension clamp terminal
393-*i* actuating element
400 apparatus
480 function-related terminal
490 lug terminal clamp
500 apparatus
580 function-related terminal
581 connection terminals
582 base plate
590 stud bolt
1000 system
A1 first axis of movement
A2 second axis of movement
S10 . . . S300 method steps

The invention claimed is:

1. An apparatus for latching and unlatching an electrical function-related module to or from at least one retaining opening of a current busbar module, comprising:

a first latching device and a second latching device, each latching device having at least one latching tooth insertable into the at least one retaining opening for latching the electrical function-related module;

wherein the at least one latching tooth of the first latching device and the at least one latching tooth of the second latching device face away from each other and are movable away from each other for engaging behind the at least one retaining opening for latching the electrical function-related module and are movable towards each other for unlatching the electrical function-related module;

a first carriage element, linearly movable along a first axis of movement;

a second carriage element, linearly movable along a second axis of movement, which is arranged perpendicular to the first axis of movement;

a first mechanical conversion device configured to convert a linear movement of the first carriage element along the first axis of movement into a linear movement of the second carriage element along the second axis of movement; and a second mechanical conversion device, which is configured to convert the linear movement of the second carriage element along the second axis of movement into a movement of the latching teeth, which belong to different latching devices, towards or away from one another.

2. The apparatus according to claim 1, wherein the first mechanical conversion device includes a first inclined portion on the first carriage member with a first predefined inclination relative to the first axis of movement, and a second inclined portion on the second carriage member with the first predefined inclination relative to the first axis of movement, wherein the second inclined section bears against the first inclined section in such a way that a linear movement of the first carriage element along the first axis of movement causes a linear movement of the second carriage element along the second axis of movement.

3. The apparatus according to claim 1, wherein the latching devices and the second mechanical conversion device are configured such that the latching teeth are moved towards each other or away from each other on a curved path.

4. The apparatus according to claim 3, wherein the latching devices are each arranged to rotate individually about a common axis of rotation, and the second mechanical conversion device is configured to convert the linear movement of the second carriage element into respective rotational movements of the latching devices towards each other or away from each other.

5. The apparatus according to claim 2, wherein the second mechanical conversion device includes at least one plunger portion on the second carriage element and at least one shoulder portion on at least one latching device, wherein each plunger portion is arranged and configured such that said plunger portion, during a movement of the second carriage element along the second axis of movement in a direction facing away from the first carriage element, it exerts a torque on the respective shoulder portion on the latching device which contains the shoulder portion.

6. The apparatus according to claim 1, wherein the latching devices and the second mechanical conversion device are configured in such a way that the latching teeth are movable towards each other or away from each other in a linear movement.

7. The apparatus according to claim 6, wherein the second mechanical conversion device includes at least one third inclined section on the second carriage element with a second predefined inclination relative to the second axis of movement and at least one fourth inclined section on at least one latching device with the second predefined inclination relative to the second axis of movement, wherein each third inclined section bears against a respective fourth inclined section in such a way that a linear movement of the second carriage element along the second axis of movement in a direction facing away from the first carriage element is converted into a movement of the latching device, which has the respective fourth inclined section, along the first axis of movement.

8. The apparatus according to claim 1, further comprising a pre-load element which is arranged and configured to exert a reciprocal pre-load on the latching devices, which pre-load favors the movement of the latching teeth-away from each other.

9. The apparatus according to claim 8, wherein each latching device has a spring receptacle, and wherein the spring receptacle of each latching device is configured to at least partially receive and fix the pre-load element configured as a spring element.

10. The apparatus according to claim 1, wherein one of the first and second carriage elements includes a function-related terminal for the electrical contacting and/or mechanical locking of the function-related module and the other of the first and second carriage elements includes at least one connection terminal which is configured and arranged to be in electrical contact with a current busbar of the current busbar module when the device is latched to the current busbar module.

11. The apparatus according to claim 10, wherein the at least one connection terminal is substantially flat and arranged parallel to the latching teeth.

12. The apparatus according to claim 11, wherein the at least one connection terminal and the latching teeth are arranged and configured to be inserted simultaneously into different retaining slots of a series of current-carrying retaining slots arranged in parallel as retaining openings of the current busbar module.

13. The apparatus according to claim 12, further comprising an electrical function-related module which is electrically connected to the function-related terminal and mechanically locked.

14. The apparatus according to claim 13, wherein:

the function-related module is configured as a power supply module and includes a frame clamp, a prism and lug terminal clamp, a tension clamp with one or more clamping bolts, and/or a stud bolt;

or the function-related module is configured as a fuse holder, a switch, a switch disconnector, a switch disconnector with fuses, or a fuse switch disconnector, or the function-related module is configured as a power supply unit, an overvoltage protection device or a motor starter.

15. A system comprising:

a current busbar module; and an apparatus according to claim 1.

16. A method for unlatching an electrical function-related module from at least one retaining opening of a current busbar module, comprising:

moving a first carriage element of an apparatus which is latched to the current busbar module by engaging behind a retaining opening of the current busbar module on both sides by at least two latching teeth, and which has a function-related terminal, to which the electrical function-related module is fastened, in a linear movement along a first axis of movement, which is arranged perpendicular to a longitudinal extent of the current busbar module;

moving, as a mechanical-automatic reaction to the movement of the first carriage element, a second carriage element along a second axis of movement which is perpendicular to the first axis of movement; and moving, as a mechanical-automatic reaction to the movement of the second carriage element, of latching teeth facing away from each other towards each other, so that the latching teeth no longer engage behind the retaining opening on both sides, as a result of which the device is unlatched from the current busbar module.

* * * * *